US010676687B2

(12) United States Patent
Malgat et al.

(10) Patent No.: US 10,676,687 B2
(45) Date of Patent: Jun. 9, 2020

(54) COMBUSTIBLE HEAT SOURCE WITH IMPROVED BINDING AGENT

(71) Applicant: Philip Morris Products S.A., Neuchatel (CH)

(72) Inventors: Alexandre Malgat, Les Tuileries de Grandson (CH); Laurent Poget, Bussigny (CH)

(73) Assignee: Philip Morris Products S.A., Neuchatel (CH)

(*) Notice: Subject to any disclaimer, the term of this patent is extended or adjusted under 35 U.S.C. 154(b) by 0 days.

(21) Appl. No.: 15/471,825

(22) Filed: Mar. 28, 2017

(65) Prior Publication Data
US 2017/0198228 A1 Jul. 13, 2017

Related U.S. Application Data

(63) Continuation of application No. 14/412,362, filed as application No. PCT/EP2013/064006 on Jul. 3, 2013.

(30) Foreign Application Priority Data

Jul. 4, 2012 (EP) ..................................... 12174915

(51) Int. Cl.
*C10L 5/10* (2006.01)
*C08K 5/098* (2006.01)
(Continued)

(52) U.S. Cl.
CPC ............ *C10L 5/105* (2013.01); *A24B 15/165* (2013.01); *C08K 3/346* (2013.01); *C08K 5/098* (2013.01);
(Continued)

(58) Field of Classification Search
None
See application file for complete search history.

(56) References Cited

U.S. PATENT DOCUMENTS

| 4,805,644 A | 2/1989 | Hampl, Jr. et al. |
| 5,027,837 A | 7/1991 | Clearman et al. |
| (Continued) | | |

FOREIGN PATENT DOCUMENTS

| CN | 1026751 C | 11/1994 |
| CN | 1028347 C | 5/1995 |
| (Continued) | | |

OTHER PUBLICATIONS

Combined Office Action and Search Report dated Jul. 4, 2017 in Russian Patent Application No. 2015103537 (with Partial English translation and English translation of categories of cited document).

(Continued)

*Primary Examiner* — Dennis R Cordray
(74) *Attorney, Agent, or Firm* — Oblon, McClelland, Maier & Neustadt, L.L.P.

(57) ABSTRACT

A combustible heat source for a smoking article is provided, including carbon and a binding agent. The binding agent includes a combination of three binder components: an organic polymeric binder material, a carboxylate burn salt, and at least one non-combustible inorganic binder material. The at least one non-combustible inorganic binder material includes a sheet silicate material. Preferably, the combustible heat source further includes an ignition aid.

23 Claims, 1 Drawing Sheet

Figure 1:
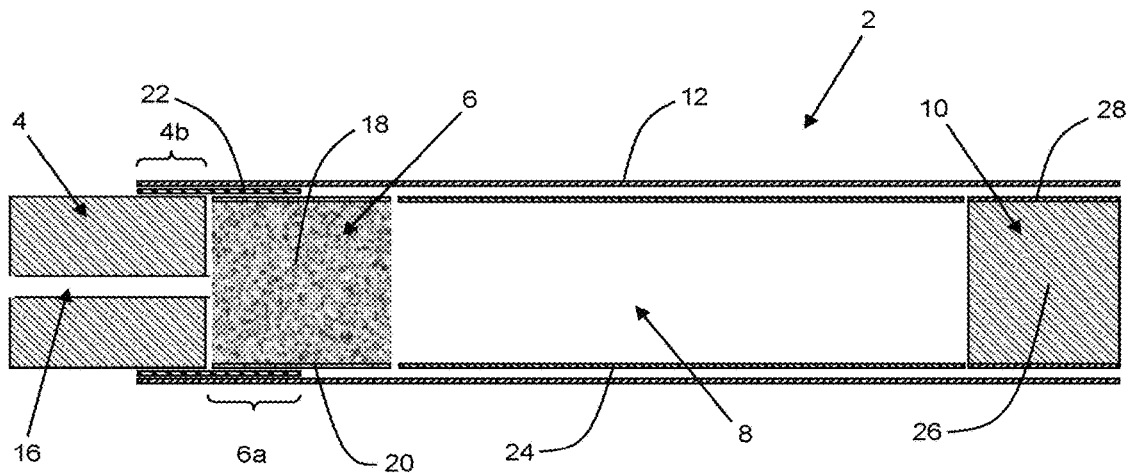

(51) Int. Cl.
*A24B 15/16* (2020.01)
*C08K 3/34* (2006.01)
*C08L 1/28* (2006.01)
*C10L 5/22* (2006.01)
*C10L 5/36* (2006.01)

(52) U.S. Cl.
CPC ............... *C08L 1/286* (2013.01); *C10L 5/22* (2013.01); *C10L 5/36* (2013.01); *C10L 2200/0254* (2013.01); *C10L 2200/0295* (2013.01); *C10L 2250/04* (2013.01); *C10L 2270/08* (2013.01); *C10L 2290/08* (2013.01); *C10L 2290/30* (2013.01)

(56) References Cited

U.S. PATENT DOCUMENTS

| | | | |
|---|---|---|---|
| 5,060,674 | A | 10/1991 | Brown et al. |
| 5,076,296 | A * | 12/1991 | Nystrom ............. A24B 15/165 131/194 |
| 5,076,297 | A | 12/1991 | Farrier et al. |
| 5,146,934 | A | 9/1992 | Deevi et al. |
| 5,178,167 | A | 1/1993 | Riggs et al. |
| 5,595,577 | A | 1/1997 | Bensalem et al. |
| 5,699,811 | A | 12/1997 | Paine, III |
| 6,095,152 | A | 8/2000 | Beven et al. |
| 6,578,584 | B1 | 6/2003 | Beven et al. |
| 2004/0025894 | A1 | 2/2004 | Beven et al. |
| 2004/0094174 | A1 | 5/2004 | Ishikawa et al. |
| 2005/0115579 | A1 | 6/2005 | Beven et al. |
| 2010/0180903 | A1 | 7/2010 | Cooper et al. |
| 2014/0326260 | A1 | 11/2014 | Gladden |

FOREIGN PATENT DOCUMENTS

| | | |
|---|---|---|
| CN | 1038222 C | 5/1998 |
| CN | 1161043 C | 8/2004 |
| CN | 101015392 A | 8/2007 |
| CN | 102458165 A | 5/2012 |
| CN | 102481021 A | 5/2012 |
| EP | 0 174 645 A2 | 3/1986 |
| EP | 0 236 992 A2 | 9/1987 |
| EP | 0 283 707 A2 | 9/1988 |
| EP | 0 339 690 A2 | 11/1989 |
| EP | 0 842 616 A1 | 5/1998 |
| EP | 1 084 629 A1 | 3/2001 |
| EP | 1 084 630 A1 | 3/2001 |
| EP | 1 670 326 B1 | 2/2007 |
| EP | 1 501 382 B1 | 12/2009 |
| EP | 2 124 656 B1 | 2/2011 |
| JP | 58-96696 A | 6/1983 |
| JP | 5-103836 A | 4/1993 |
| JP | 10-507629 A | 7/1998 |
| JP | 2003-116512 A | 4/2003 |
| RU | 2004 135 065 A | 1/2006 |
| RU | 2 302 805 C2 | 7/2007 |
| RU | 2 336 001 C2 | 10/2008 |
| RU | 2 357 623 C2 | 6/2009 |
| TW | I308484 | 4/2009 |
| WO | WO 2007/012980 A1 | 2/2007 |
| WO | WO 2009/022232 A2 | 2/2009 |
| WO | WO 2010/033665 A1 | 3/2010 |
| WO | WO 2010/051076 A1 | 5/2010 |
| WO | WO 2011/117750 A2 | 9/2011 |
| WO | WO 2011/139730 A1 | 11/2011 |
| WO | WO 2012/164077 A1 * | 12/2012 |
| WO | WO 2013/120855 A1 | 8/2013 |

OTHER PUBLICATIONS

Extended European Search Report dated Feb. 25, 2013 in Patent Application No. 12174915.4.
Henry R. Kraybill, "Effect of some alkali salts upon fire-holding capacity of tobacco" Botanical Gazette, vol. 64, No. 1, 1917, pp. 42-56.
International Search Report dated Dec. 13, 2013 in PCT/EP13/064006 Filed Jul. 3, 2013.
Office Action dated Sep. 16, 2016 in Kazakhstan Patent Application No. 2015/0126.1 (with English translation).
Combined Chinese Office Action and Search Report dated Jun. 13, 2016 in Patent Application No. 201380040899.3 (with English language translation).
Combined Chinese Office Action and Search Report dated Jan. 16, 2017 in Application No. 201380040899.3 (with English language translation).
Japanese Office Action dated Apr. 5, 2017 in Patent Application No. 2015-519206 (with English translation).
Combined Taiwanese Office Action and Search Report dated May 15, 2017 in Taiwanese Patent Application No. 102123914 (with unedited computer generated English translation).
Office Action dated Feb. 23, 2018 in Chinese Patent Application No. 201380040899.3 (with English language translation), 7 pages.
Office Action dated May 23, 2018 in corresponding European Patent Application No. 13 744 982.3 (with English Translation), 5 pages.

* cited by examiner

COMBUSTIBLE HEAT SOURCE WITH IMPROVED BINDING AGENT

CROSS-REFERENCE TO RELATED APPLICATIONS

This application is a continuation of and claims the benefit of priority under 35 U.S.C. § 120 from U.S. application Ser. No. 14/412,362, filed on Dec. 31, 2014, which is a U.S. National Stage application of PCT/EP2013/064006, filed Jul. 3, 2013 and claims the benefit of priority under 35 U.S.C. § 119 from EP 12174915.4, filed Jul. 4, 2012, the entire contents of each of which are incorporated herein by reference.

The present invention relates to a combustible heat source for a smoking article, the heat source comprising carbon and an improved binding agent including a combination of organic and inorganic binder materials. The invention further relates to a heated smoking article comprising such a combustible heat source and an aerosol-forming substrate.

A number of smoking articles in which tobacco is heated rather than combusted have been proposed in the art. One aim of such 'heated' smoking articles is to reduce known harmful smoke constituents of the type produced by the combustion and pyrolytic degradation of tobacco in conventional cigarettes.

In one known type of heated smoking article, an aerosol is generated by the transfer of heat from a combustible heat source to an aerosol-forming substrate located downstream of the combustible heat source. During smoking, volatile compounds are released from the aerosol-forming substrate by heat transfer from the combustible heat source and entrained in air drawn through the smoking article. As the released compounds cool, they condense to form an aerosol that is inhaled by the user.

For example, WO-A-2009/022232 discloses a smoking article comprising a combustible heat source, an aerosol-forming substrate downstream of the combustible heat source, and a heat-conducting element around and in contact with a rear portion of the combustible heat source and an adjacent front portion of the aerosol-forming substrate. The heat-conducting element in the smoking article of WO-A-2009/022232 helps transfer the heat generated during combustion of the heat source to the aerosol-forming substrate.

Some carbon-based heat sources incorporate an organic binder, such as a cellulose derivative, to help improve integrity of the heat source during manufacture, processing and storage. However, organic binders are typically combustible at the temperatures reached within the heat source during burning. As a result, the organic binders have been found to disintegrate during smoking of the heated smoking article, leading to a loss of integrity of the heat source.

The disintegration of the organic binder may result in deformation of the heat source during and after burning, which may in turn cause cracking or breakage of the heat source or the release of ash from the combusted heat source. Furthermore, during burning of the organic binder, gases are typically released which create pressure within the heat source, further increasing the likelihood of cracking or breakage.

It would be desirable to provide a combustible heat source for a heated smoking article, which has improved integrity during and after smoking. It would be particularly desirable to provide such a combustible heat source which also has improved burning properties.

According to the invention there is provided a combustible heat source for a smoking article, the combustible heat source comprising carbon and a binding agent including at least one organic polymeric binder material, at least one carboxylate burn salt and at least one non-combustible, inorganic binder material, wherein the at least one non-combustible inorganic binder material comprises a sheet silicate material.

According to the invention there is also provided a smoking article comprising a combustible heat source according to the invention, as defined above, and an aerosol-forming substrate downstream of the combustible heat source.

The invention further provides the use of a binding agent to improve the integrity of a carbon-containing combustible heat source for a smoking article, the binding agent comprising at least one organic polymeric binder material, at least one carboxylate burn salt and at least one non-combustible inorganic binder material, wherein the at least one non-combustible inorganic binder material comprises a sheet silicate material.

The invention further provides a method of producing a combustible heat source having improved integrity, the method comprising the steps of: combining one or more carbon-containing materials with a binding agent including at least one organic polymeric binder material, at least one carboxylate burn salt and at least one non-combustible inorganic binder material, wherein the at least one non-combustible inorganic binder material comprises a sheet silicate material; pre-forming the mixture of the one or more carbon-containing materials and the binding agent into an elongate rod; and drying the elongate rod.

The combustible heat source of the invention may be an extruded heat source, formed by an extrusion process, as described in more detail below. Alternatively and preferably, the combustible heat source of the invention may be a pressed heat source, formed by a pressing process, as also described in more detail below. Pressed heat sources have been found to show the most improvement in integrity as a result of the use of a binding agent including the combination of three components defined above.

The term "binding agent" is used herein to refer to the component of the combustible heat source that binds the carbon and any other additives within the heat source together, such that a solid heat source can be formed that retains its structure.

The term "carboxylate burn salt" is used herein to refer to a salt of a carboxylic acid, which is believed to modify carbon combustion. Preferably, the carboxylate burn salt comprises a monovalent, divalent, or trivalent cation and a carboxylate anion at room temperature, wherein the carboxylate anion burns when the combustible heat source is lit. More preferably, the carboxylate burn salt is an alkali metal carboxylate burn salt comprising a monovalent alkali metal cation and a carboxylate anion at room temperature, wherein the carboxylate anion burns when the combustible heat source is lit. Specific examples of carboxylate burn salts that may be included in the binding agent of the combustible heat source of the invention include, but are not limited to, alkali metal acetates, alkali metal citrates and alkali metal succinates.

In certain embodiments, the binding agent may include a single carboxylate burn salt. In other embodiments, the binding agent may comprise a combination of two or more different carboxylate burn salts. The two or more different carboxylate burn salts may comprise different carboxylate anions. Alternatively or in addition, the two or more different carboxylate burn salts may comprise different cations. By way of example, the binding agent may comprise a mixture of an alkali metal citrate and an alkaline earth metal succinate.

The term "non-combustible" is used herein to refer to an inorganic binder material that does not burn or decompose during ignition and burning of the combustible heat source of the invention. The non-combustible inorganic binder material is therefore stable at the temperatures to which the binding agent is subjected during burning of the combustible heat source and will remain substantially intact during and after burning.

The terms "upstream", "front", "downstream" and "rear" are used herein to describe the relative positions of components or portions of components of smoking articles of the invention in relation to the direction of air drawn through the smoking articles during use.

In the combustible heat source of the invention, carbon is combined with a binding agent formed of a specific novel combination of organic and inorganic binder materials. In particular, an organic polymeric binder material, such as those used in the combustible heat sources of the prior art, is combined with at least one carboxylate burn salt and at least one non-combustible inorganic binder material wherein the at least one non-combustible inorganic binder material comprises a sheet silicate material. In the following description, the organic polymeric binder material, the carboxylate burn salt and the non-combustible inorganic binder material are referred to collectively as the "binder components".

The use of a binding agent including a specific combination of an organic polymeric binder material, a carboxylate burn salt and a non-combustible inorganic binder material comprising a sheet silicate material has advantageously been found to increase the integrity of the combustible heat source during and after burning, compared to a heat source comprising only organic binder material. The combustible heat source of the invention exhibits reduced deformation due to burning so that the occurrence of cracks, breakage or fragmentation of the heat source is reduced. Furthermore, the combustible heat source of the invention forms a more cohesive ash after burning, so that particles or fragments of the ash are less likely to break away from the heat source. The appearance of the ash is also found to be improved, with a more uniform consistency and a darker and more uniform colour.

The term "integrity" is used herein to refer to the ability of the combustible heat source of the invention to remain whole or intact. Any significant loss of integrity of the combustible heat source can result in cracking or breakage of the heat source. Poor integrity of a combustible heat source may also be indicated by the generation of sparks or flames during lighting of the heat source.

As described in more detail below, a quantitative measure of the integrity of a combustible heat source can be provided using an experimental test in which the likelihood of a part of the combustible heat source within a heated smoking article dropping off under controlled burn conditions, known as "drop off", is measured. In particular, the test provides for a direct comparison of the integrity of combustible heat sources including different binding agents. It has been found that the likelihood of drop off for a combustible heat source of the invention is reduced compared to the likelihood of drop off under the same conditions for a combustible heat source of the prior art including only organic binder material.

The lower the likelihood of drop off for a combustible heat source, the better the integrity of the combustible heat source is considered to be. Preferably, the likelihood of drop off for a combustible heat source of the invention is less than 20 percent, more preferably less than 10 percent and most preferably close to 0 percent under the experimental conditions described below.

The improvement provided in the integrity of the combustible heat source as a result of the use of the specific combination of binder components defined above is greater than could be predicted based on the behaviour of the individual binder components. In addition, the use of the combination of the three binder components has been shown to provide an unexpected improvement in the mechanical strength of the combustible heat source, as demonstrated by an increase in the compressive strength of the combustible heat source. The binding agent therefore provides surprising, advantageous effects on the physical properties of the combustible heat source of the invention.

It has also advantageously been found that the ratio of the three binder components of the binding agent of the combustible heat source of the invention can be adjusted in order to modify and improve the burning properties of the heat source. For example, the ratio of the binder components may be adapted to increase the burn temperature or the burn lifetime of the heat source compared to a heat source including only organic binder material.

The use of a binding agent comprising the combination of three different binder components in the combustible heat source of the invention has also advantageously been shown to increase the speed of propagation of combustion of the carbon of the heat source from the front end to the rear end of the heat source after ignition of the front end thereof. The propagation of the combustion of the carbon through the combustible heat source is clearly shown by a change in colour at the surface of the combustible heat source due to downstream movement of a deflagration front from the front end to the rear end of the combustible heat source. The faster propagation of the combustion of the carbon through the combustible heat source after ignition advantageously reduces the time to first puff. As described in more detail below, the three different binder components of the binding agent each provide a different structure and function within the combustible heat source. Furthermore, the binder components each behave differently upon burning of the combustible heat source. The combination of the different properties and behaviours of the binder components provides improved binding effects and in particular the surprising improvement in the integrity of the combustible heat source.

The organic polymeric binder in the binding agent of the combustible heat source of the invention is typically formed of long and flexible organic polymers. The organic polymeric binder material is typically a good fuel which improves the burning qualities of the combustible heat source. As set out above, the organic polymeric binder material also helps bind the carbon during production of the combustible heat source and prior to burning. However, the organic polymeric binder material burns away after ignition of the heat source and so does not provide any significant binding effect during or after burning.

The organic polymeric binder material may include any suitable organic polymeric binders that do not produce harmful by-products upon heating or burning. The organic polymeric binder material may include a single type of organic polymer or a combination of two of more different types of organic polymer. Preferably, the organic polymeric binder material comprises one or more cellulosic polymer materials. Suitable cellulosic polymer materials include but are not limited to cellulose, modified cellulose, methyl cellulose, carboxymethyl cellulose, hydroxypropyl cellulose, hydroxypropyl methylcellulose and combinations thereof. In particularly preferred embodiments of the invention, the organic polymeric binder material comprises carboxymethyl cellulose (CMC). A suitable source of CMC for use in the invention is available from Phrikolat GmbH, Germany. Alternatively or in addition to the one or more cellulosic polymer materials, the organic polymeric binder material may comprise one or more non-cellulosic polymer materials, including but not limited to gums, such as for example guar gum; wheat flour; starches; sugars; vegetable oils and combinations thereof.

Preferably, the binding agent includes between about 25 percent by weight and about 80 percent by weight of the organic polymeric binder material, more preferably between about 30 percent by weight and about 75 percent by weight of the organic polymeric binder material.

In contrast to the organic polymeric binder material, the carboxylate burn salt in the binding agent of the combustible heat source of the invention typically comprises ions that are generally smaller in size to the other, larger molecules in the heat source. The carboxylate burn salt promotes the combustion of the heat source. In addition, unlike the organic binder, the carboxylate burn salt has been found to retain a cohesive structure around the other molecules within the combustible heat source during and after burning, which helps to bind the heat source materials together. The carboxylate burn salt therefore improves the integrity of the combustible heat source during and after burning and reduces the likelihood of deformation and breakage of the heat source. The retention of the binding effect of the carboxylate burn salt after burning additionally improves the cohesion and appearance of the ash material.

The inclusion of a carboxylate burn salt in the combustible heat source of the invention additionally provides improvement in the burning properties of the combustible heat source. In particular, the carboxylate burn salt may increase the burning time of the combustible heat source of the invention compared to combustible heat sources including only organic binder material. Furthermore, the promotion of combustion of the heat source by the carboxylate burn salt may enable a combustible heat source of a higher density to be used in a heated smoking article. This enables a combustible heat source to be produced with a higher quantity of the carbon fuel for a heat source of a given size, which can further improve the burning time of the combustible heat source.

Preferably, the carboxylate burn salt is a potassium or sodium salt of a carboxylic acid such as a citrate, acetate or succinate. In preferred embodiments, the carboxylate burn salt is an alkali metal citrate salt. In particularly preferred embodiments of the invention, the carboxylate burn salt is potassium citrate, most preferably mono-potassium citrate.

The nature of the cation and the nature of the anion selected for the carboxylate burn salt may both have an impact on the burning properties of the combustible heat source and in particular, on the burning lifetime, the burning temperature and the initial temperature during ignition of the combustible heat source. The nature of the carboxylate burn salt and the amount of carboxylate burn salt incorporated into the binding agent can therefore be adjusted depending on the desired burning properties of the combustible heat source.

Preferably, the binding agent comprises between about 5 percent by weight and about 50 percent by weight of the carboxylate burn salt, more preferably between about 8 percent by weight and about 40 percent by weight of the carboxylate burn salt.

The non-combustible inorganic binder material comprises a sheet silicate material.

The inorganic binder material is preferably formed of a material with relatively large, flat and inflexible molecules. The inorganic binder material is non-combustible at the temperatures reached within the combustible heat source during burning, so that the inorganic binder is still present after ignition and burning of the heat source. The inorganic binder material therefore retains its binding properties and will continue to bind together the heat source materials after the organic binder has been burnt away. At certain levels, the addition of an inorganic binder material may additionally increase the burning temperature of the combustible heat source so that the burning properties can be adjusted. In particular, the level of the non-combustible inorganic binder material may be adjusted to increase the temperature of the heat source during ignition.

The inorganic binder material may include any suitable inorganic binders that are inert and do not burn or decompose during combustion of the heat source. The non-combustible inorganic binder material may include a single type of inorganic binder or a combination of two or more different types of inorganic binder. Suitable sheet silicate materials for inclusion in the non-combustible inorganic binder material include but are not limited to clays, micas, serpentinites and combinations thereof. In particularly preferred embodiments, the non-combustible inorganic binder material comprises one or more clays. Other suitable inorganic binders for inclusion in the non-combustible inorganic binder material include but are not limited to aluminasilicate derivatives, alkali silicates, limestone derivatives, alkaline earth compounds and derivatives, aluminium compounds and derivatives, and combinations thereof.

The term "clay" is used herein to refer to aluminium phyllosilicate materials formed of two dimensional sheets of silicate and aluminate ions, which form a distinct layered structure within the clay. Suitable clays for use in the in the binding agent of the combustible heat source of the invention include, but are not limited to, bentonite, montmorillonite and kaolinite. Suitable clays are available from Worlee-Chimie GmbH, Germany or Nanocor.

Particularly preferably, the one or more clays used in the binding agent of the combustible heat source of the invention are exfoliated clays. The term "exfoliated clays" is used herein to refer to clays which have undergone an exfoliation or delamination process, in which the separation between the layers of silicate and aluminate sheets is increased, in some cases by up to 20 times or more.

The large, flat structure of sheet silicate materials such as clays is in contrast to the long, flexible molecules of the organic binder material and the small ions of the carboxylate burn salt. The combination of the binder molecules with these different structures has been found to be effective in providing improved binding properties, not only during production and storage of the combustible heat source of the invention, but also during and after burning.

Preferably, the binding agent comprises between about 10 percent by weight and about 35 percent by weight of the non-combustible inorganic binder material, more preferably between about 15 percent by weight and about 35 percent by weight of the non-combustible inorganic binder material.

In particularly preferred embodiments of the invention, the combustible heat source comprises a binding agent comprising a combination of carboxymethyl cellulose as the organic binder material, potassium citrate as the carboxylate burn salt and clay as the non-combustible inorganic binder material. In certain preferred embodiments, the binding agent comprises about 73 percent by weight of carboxymethyl cellulose as the organic binder material, about 17 percent by weight of potassium citrate as the carboxylate burn salt and about 10 percent by weight of clay as the non-combustible inorganic binder material.

This combination of binder components has been found to show particularly effective binding properties and the resultant combustible heat sources retain integrity, with little or no visible deformation or cracking during or after burning. The ash that remains after combustion of the combustible heat source including this combination of binder components has also been found to have an improved cohesion and appearance compared to combustible heat sources of the prior art including only organic binder material.

Combustible heat sources of the invention preferably comprise between about 2 percent by weight and about 10 percent by weight of the binding agent including the three different binder components, more preferably between about 4 percent by weight and about 10 percent by weight of the binding agent and most preferably between about 5 percent by weight and about 9 percent by weight of the binding agent. In certain preferred embodiments, combustible heat sources of the invention comprise about 8 percent by weight of the binding agent The binding agent is preferably incorporated into the combustible heat source of the invention during production of the heat source. A combination of the three binder components of the binding agent may be incorporated into the heat source material in a single step during production or the three binder components may be added in two or three separate steps.

One or more binder components of the binding agent may be added to the other components of the combustible heat source in the form of a solid, substantially dry powder. Alternatively, one or more of the binder components of the binding agent may be added to the other components of the combustible heat source in the form of a binder solution comprising the one or more binder components dissolved or suspended in a suitable solvent, such as water. Preferably, at least the carboxylate burn salt is added to the other components of the combustible heat source in the form of a solution. For example, where the carboxylate burn salt comprises potassium citrate, a solution of between 5 wt % and 10 wt % of potassium citrate in water may be used.

Where one or more of the binder components of the binding agent are incorporated in the form of a binder solution, the pH of the binder solution is preferably adapted to a basic pH of at least pH 8, more preferably at least pH 10 and most preferably about pH 12. The natural pH of the solution will typically be acidic and in such cases the pH can readily be increased through the addition of a suitable alkali.

The binder components and in particular the organic polymeric binder material are typically sensitive to changes in pH. This may be particularly true for a charged organic polymeric binder material, for which an increase in the pH of the binder solution may influence the charge on the binder molecules and therefore the molecular configuration and the binding properties. It has been found that the use of a binder solution having a basic pH (pH 8 or above) improves the burning properties of the combustible heat source of the invention compared to a similar combustible heat source formed using an acidic binder solution. In particular, it has been found that the combustible heat source has an increased burn lifetime so that the combustible heat source can continue burning for a longer time.

Furthermore, the use of a basic binder solution has been found to produce a combustible heat source of increased density and to improve the integrity of the combustible heat source after burning compared to a similar combustible heat source formed using an acidic binder solution.

Combustible heat sources of the invention are carbon-containing heat source comprising carbon as a fuel. Preferably, combustible heat sources according to the invention have a carbon content of at least about 35 percent, more preferably of at least about 40 percent, most preferably of at least about 45 percent by dry weight of the combustible heat source.

In some embodiments, the combustible heat source according to the invention is a carbon-based heat source. As used herein, the term "carbon-based heat source" is used to describe a heat source comprised primarily of carbon. Combustible carbon-based heat sources for use in smoking articles according to the invention may have a carbon content of at least about 50 percent, preferably of at least about 60 percent, more preferably of at least about 70 percent, most preferably of at least about 80 percent by dry weight of the combustible carbon-based heat source.

Combustible heat sources according to the invention may be formed from one or more suitable carbon-containing materials. Suitable carbon-containing materials are well known in the art and include, but are not limited to, carbon powder.

Combustible heat sources according to the invention preferably further comprise at least one ignition aid.

As used herein, the term "ignition aid" denotes a material that releases one or both of energy and oxygen during ignition of the combustible heat source, where the rate of release of one or both of energy and oxygen by the material is not ambient oxygen diffusion limited. In other words, the rate of release of one or both of energy and oxygen by the material during ignition of the combustible heat source is largely independent of the rate at which ambient oxygen can reach the material. As used herein, the term "ignition aid" also denotes an elemental metal that releases energy during ignition of the combustible heat source, wherein the ignition temperature of the elemental metal is below about 500° C. and the heat of combustion of the elemental metal is at least about 5 kJ/g.

As used herein, the term "ignition aid" does not include carboxylate burn salts, as defined above.

Suitable ignition aids for use in the combustible heat source of the invention are known in the art.

Combustible heat sources according to the invention may comprise one or more ignition aids consisting of a single element or compound that release energy upon ignition of the combustible heat source. The release of energy by the one or more ignition aids upon ignition of the combustible heat source directly causes a 'boost' in temperature during an initial stage of combustion of the combustible heat source.

For example, in certain embodiments combustible heat sources according to the invention may comprise one or more energetic materials consisting of a single element or compound that reacts exothermically with oxygen upon ignition of the combustible heat sources. Examples of suitable energetic materials include, but are not limited to, aluminium, iron, magnesium and zirconium.

Alternatively or in addition, combustible heat sources according to the invention may comprise one or more ignition aids comprising two or more elements or compounds that react with one another to release energy upon ignition of the combustible heat source.

For example, in certain embodiments combustible heat sources according to the invention may comprise one or more thermites or thermite composites comprising a reducing agent such as, for example, a metal, and an oxidizing agent such as, for example, a metal oxide, that react with one another to release energy upon ignition of the combustible heat sources. Examples of suitable metals include, but are not limited to, magnesium, and examples of suitable metal oxides include, but are not limited to, iron oxide ($Fe_2O_3$) and aluminium oxide ($Al_2O_3$)

In other embodiments, combustible heat sources according to the invention may comprise one or more ignition aids comprising other materials that undergo exothermic reactions upon ignition of the combustible heat source. Examples of suitable metals include, but are not limited to, intermetallic and bi-metallic materials, metal carbides and metal hydrides.

In preferred embodiments, combustible heat sources according to the invention comprise at least one ignition aid that releases oxygen during ignition of the combustible heat source.

In such embodiments, the release of oxygen by the at least one ignition aid upon ignition of the combustible heat source indirectly results in a 'boost' in temperature during an initial stage of combustion of the combustible heat source by increasing the rate of combustion of the combustible heat source.

For example, combustible heat sources according to the invention may comprise one or more oxidizing agents that decompose to release oxygen upon ignition of the combustible heat source. Combustible heat sources according to the invention may comprise organic oxidizing agents, inorganic oxidizing agents or a combination thereof. Examples of suitable oxidizing agents include, but are not limited to: nitrates such as, for example, potassium nitrate, calcium nitrate, strontium nitrate, sodium nitrate, barium nitrate, lithium nitrate, aluminium nitrate and iron nitrate; nitrites; other organic and inorganic nitro compounds; chlorates such as, for example, sodium chlorate and potassium chlorate; perchlorates such as, for example, sodium perchlorate; chlorites; bromates such as, for example, sodium bromate and potassium bromate; perbromates; bromites; borates such as, for example, sodium borate and potassium borate; ferrates such as, for example, barium ferrate; ferrites; manganates such as, for example, potassium manganate; permanganates such as, for example, potassium permanganate; organic peroxides such as, for example, benzoyl peroxide and acetone peroxide; inorganic peroxides such as, for example, hydrogen peroxide, strontium peroxide, magnesium peroxide, calcium peroxide, barium peroxide, zinc peroxide and lithium peroxide; superoxides such as, for example, potassium superoxide and sodium superoxide; iodates; periodates; iodites; sulphates; sulfites; other sulfoxides; phosphates; phosphinates; phosphites; and phosphanites.

Alternatively or in addition, combustible heat sources according to the invention may comprise one or more oxygen storage or sequestering materials that release oxygen upon ignition of the combustible heat source. Combustible heat sources according to the invention may comprise oxygen storage or sequestering materials that store and release oxygen by means of encapsulation, physisorption, chemisorption, structural change or a combination thereof. Examples of suitable oxygen storage or sequestering materials include, but are not limited to: metal surfaces such as, for example, metallic silver or metallic gold surfaces; mixed metal oxides; molecular sieves; zeolites; metal-organic frameworks; covalent organic frameworks; spinels; and perovskites.

Combustible heat sources according to the invention may comprise one or more ignition aids consisting of a single element or compound that release oxygen upon ignition of the combustible heat source. Alternatively or in addition, combustible heat sources according to the invention may comprise one or more ignition aids comprising two or more elements or compounds that react with one another to release oxygen upon ignition of the combustible heat source.

Combustible heat sources according to the invention may comprise one or more ignition aids that release both energy and oxygen upon ignition of the combustible heat source. For example, combustible heat sources according to the invention may comprise one or more oxidizing agents that decompose exothermically to release oxygen upon ignition of the combustible heat source.

Alternatively, or in addition, combustible heat sources according to the invention may comprise one or more first ignition aids that release energy upon ignition of the combustible heat source and one or more second ignition aids, which are different from the one or more first ignition aids and that release oxygen upon ignition of the combustible heat source.

In certain embodiments, combustible heat sources according to the invention may comprise at least one metal nitrate salt having a thermal decomposition temperature of less than about 600° C., more preferably of less than about 400° C.

Preferably, the at least one metal nitrate salt has a decomposition temperature of between about 150° C. and about 600° C., more preferably of between about 200° C. and about 400° C.

In such embodiments, when the combustible heat source is exposed to a conventional yellow flame lighter or other ignition means, the at least one metal nitrate salt decomposes to release oxygen and energy. This causes an initial boost in the temperature of the combustible heat source and also aids in the ignition of the combustible heat source. Following decomposition of the at least one metal nitrate salt, the combustible heat source continues to combust at a lower temperature.

The inclusion of at least one metal nitrate salt advantageously results in ignition of the combustible heat source being initiated internally, and not only at a point on the surface thereof. In certain embodiments, the at least one metal nitrate salt is distributed substantially homogeneously throughout the combustible heat source.

Preferably, the at least one metal nitrate salt is present in the combustible heat source in an amount of between about 20 percent and about 50 percent by dry weight of the combustible heat source.

Preferably, the at least one metal nitrate salt is selected from the group consisting of potassium nitrate, sodium nitrate, calcium nitrate, strontium nitrate, barium nitrate, lithium nitrate, aluminium nitrate and iron nitrate.

In certain embodiments, combustible heat sources according to the invention may comprise at least two different metal nitrate salts.

In one embodiment, combustible heat sources according to the invention comprise potassium nitrate, calcium nitrate and strontium nitrate. Preferably, the potassium nitrate is present in an amount of between about 5 percent and about 15 percent by dry weight of the combustible heat sources the calcium nitrate is present in an amount of between about 2 percent and about 10 percent by dry weight of the combustible heat source and the strontium nitrate is present in an amount of between about 15 percent by weight and about 25 percent by dry weight of the combustible heat source.

In other embodiments, combustible heat sources according to the invention may comprise at least one peroxide or superoxide that actively evolves oxygen at a temperature of less than about 600° C., more preferably at a temperature of less than about 400° C.

Preferably, the at least one peroxide or superoxide actively evolves oxygen at a temperature of between about 150° C. and about 600° C., more preferably of between about 200° C. and about 400° C., most preferably at a temperature of about 350° C.

In use, when the combustible heat source is exposed to a yellow flame lighter or other ignition means, the at least one peroxide or superoxide decomposes to release oxygen. This causes an initial boost in the temperature of the combustible heat sources and also aids in the ignition of the combustible heat sources. Following decomposition of the at least one peroxide or superoxide, the combustible heat source continues to combust at a lower temperature.

Preferably, the at least one peroxide or superoxide is present in the combustible heat sources in an amount of between about 20 percent and about 50 percent by dry weight of the combustible heat sources, more preferably in an amount of between about 30 percent and about 50 percent by dry weight of the combustible heat source.

Suitable peroxides and superoxides for inclusion in combustible heat sources according to the invention include, but are not limited to, calcium peroxide, strontium peroxide, magnesium peroxide, barium peroxide, lithium peroxide, zinc peroxide, potassium superoxide and sodium superoxide.

Preferably, the at least one peroxide is selected from the group consisting of calcium peroxide, strontium peroxide, magnesium peroxide, barium peroxide and combinations thereof.

Alternatively or in addition to the at least one ignition aid, combustible heat sources according to the invention may comprise one or more other additives to improve the properties of the combustible heat sources. Suitable additives include, but are not limited to, additives to promote consolidation of the combustible heat source (for example, sintering aids) and additives to promote decomposition of one or more gases produced by combustion of the combustible heat source (for example catalysts, such as CuO, $Fe_2O_3$ and $Al_2O_3$).

Combustible heat sources according to the invention are preferably formed by mixing one or more carbon-containing materials with the binding agent and other additives, where included, and pre-forming the mixture into a desired shape. The mixture of one or more carbon containing materials, binding agent and optional other additives may be pre-formed into a desired shape using any suitable known ceramic forming methods such as, for example, slip casting, extrusion, injection moulding, die compaction or pressing. In certain preferred embodiments, the mixture is pre-formed into a desired shape by extrusion or pressing.

Preferably, the mixture of one or more carbon-containing materials, binding agent and other additives is pre-formed into an elongate rod. However, it will be appreciated that the mixture of one or more carbon-containing materials, binding agent and other additives may be pre-formed into other desired shapes.

After formation, particularly after extrusion, the elongate rod or other desired shape is preferably dried to reduce its moisture content and then pyrolysed in a non-oxidizing atmosphere at a temperature sufficient to carbonise the binding agent and substantially eliminate any volatiles in the elongate rod or other shape. The elongate rod or other desired shape is pyrolysed, preferably in a nitrogen atmosphere at a temperature of between about 700° C. and about 900° C.

The combustible heat source preferably has a porosity of between about 20 percent and about 80 percent, more preferably of between about 20 percent and 60 percent. Even more preferably, the combustible heat source has a porosity of between about 50 percent and about 70 percent, more preferably of between about 50 percent and about 60 percent as measured by, for example, mercury porosimetry or helium pycnometry. The required porosity may be readily achieved during production of the combustible heat source using conventional methods and technology.

Advantageously, combustible heat sources according to the invention have an apparent density of between about 0.6 $g/cm^3$ and about 1.0 $g/cm^3$.

Preferably, combustible heat sources according to the invention have a mass of between about 300 mg and about 500 mg, more preferably of between about 400 mg and about 450 mg.

Preferably, combustible heat sources according to the invention have a length of between about 5 mm and about 20 mm, more preferably of between about 7 mm and about 15 mm, most preferably of between about 11 mm and about 13 mm. As used herein, the term "length" denotes the maximum longitudinal dimension of elongate combustible heat sources according to the invention between the upstream end and the downstream end thereof.

Preferably, combustible heat sources according to the invention have a diameter of between about 5 mm and about 10 mm, more preferably of between about 7 mm and about 8 mm. As used herein, the term "diameter" denotes the maximum transverse dimension of elongate combustible heat sources according to the invention.

Preferably, combustible heat sources according to the invention are of substantially uniform diameter. However, combustible heat sources according to the invention may alternatively be tapered so that the diameter of the rear portion of the combustible heat source is greater than the diameter of the front portion thereof. Particularly preferred are combustible heat sources that are substantially cylindrical. The combustible heat source may, for example, be a cylinder or tapered cylinder of substantially circular cross-section or a cylinder or tapered cylinder of substantially elliptical cross-section.

Combustible heat sources according to the invention may be "blind" combustible heat sources. As used herein, the term "blind combustible heat source" is used to denote a combustible heat source that does not contain any longitudinal airflow channels. As used herein, the term "longitudinal airflow channel" is used to denote a hole passing through an inner portion of the combustible heat source and extending along the entire length of the combustible heat source.

Alternatively, combustible heat sources according to the invention may comprise at least one longitudinal airflow channel. For example, combustible heat sources according to the invention may comprise one, two or three longitudinal airflow channels. In such embodiments, combustible heat sources according to the invention preferably comprise a single longitudinal airflow channel, more preferably a single substantially central longitudinal airflow channel. The diameter of the single longitudinal airflow channel is preferably between about 1.5 mm and about 3 mm.

The inner surface of the at least one longitudinal airflow channel of combustible heat sources according to the invention may be partially or entirely coated. Preferably, the coating covers the inner surface of all longitudinal airflow channels.

Optionally, combustible heat sources according to the invention may comprise one or more, preferably up to and including six, longitudinal grooves that extend along part of or the entire periphery of the combustible heat sources. If desired, combustible heat sources according to the invention may comprise one or more longitudinal grooves and at least one longitudinal airflow channel. Alternatively, combustible heat sources according to the invention may be blind combustible heat sources comprising one or more longitudinal grooves.

Preferably, at least a part of the combustible heat sources according to the invention is wrapped in a combustion resistant wrapper. The term "combustion resistant" is used herein to refer to a wrapper that remains substantially intact throughout combustion of the combustible heat source. The combustion resistant wrapper is preferably wrapped around and in direct contact with at least a part of the combustible heat source. Preferably, at least a rear or downstream part of the combustible heat source is wrapped in the combustion resistant wrapper. Preferably, at least a front or upstream part of the combustible heat source is not wrapped in the combustion resistant wrapper.

Combustible heat sources according to the invention may be wrapped in a combustion resistant wrapper that is heat-conducting.

In use in smoking articles according to the invention, heat generated during combustion of combustible heat sources according to the invention wrapped in a heat-conducting combustion resistant wrapper may be transferred by conduction to the aerosol-forming substrate of the smoking articles via the heat-conducting combustion resistant wrapper.

Alternatively or in addition, combustible heat sources according to the invention may be wrapped in an oxygen-restricting combustion resistant wrapper that restricts or prevents oxygen access to the at least part of the combustible heat sources wrapped in the oxygen-restricting combustion resistant wrapper. For example, combustible heat sources according to the invention may be wrapped in a substantially oxygen impermeable combustion resistant wrapper. In such embodiments, the at least part of the combustible heat sources wrapped in the oxygen-restricting combustion resistant wrapper substantially lacks access to oxygen and therefore does not combust.

Preferably, combustible heat sources according to the invention are wrapped in a combustion resistant wrapper that is both heat-conducting and oxygen restricting.

Suitable combustion resistant wrappers for use in the invention include, but are not limited to: metal foil wrappers such as, for example, aluminium foil wrappers, steel foil wrappers, iron foil wrappers and copper foil wrappers; metal alloy foil wrappers; graphite foil wrappers; glass fibre wrappers; ceramic fibre wrappers; and certain paper wrappers.

In smoking articles according to the invention, preferably at least a rear part of the combustible heat source and at least a front part of the aerosol-forming substrate are wrapped in the combustion resistant wrapper as described above. Preferably, a front part of the combustible heat source is not wrapped in the combustion resistant wrapper. Preferably, a rear part of the aerosol-forming substrate is not wrapper in the combustion resistant wrapper.

Preferably, the rear part of the combustible heat source wrapped in the combustion resistant wrapper is between about 2 mm and about 8 mm in length, more preferably between about 3 mm and about 5 mm in length.

Preferably, the front part of the combustible heat source not wrapped in the combustion resistant wrapper is between about 4 mm and about 15 mm in length, more preferably between about 4 mm and about 8 mm in length.

Preferably, the aerosol-forming substrate has a length of between about 5 mm and about 20 mm, more preferably of between about 8 mm and about 12 mm. Preferably, the front part of the aerosol-forming substrate wrapped in the combustion resistant wrapper is between about 2 mm and about 10 mm in length, more preferably between about 3 mm and about 8 mm in length, most preferably between about 4 mm and about 6 mm in length. Preferably, the rear part of the aerosol-forming substrate not wrapped in the combustion resistant wrapper is between about 3 mm and about 10 mm in length. In other words, the aerosol-forming substrate preferably extends between about 3 mm and about 10 mm downstream beyond the combustion resistant wrapper. More preferably, the aerosol-forming substrate extends at least about 4 mm downstream beyond the combustion resistant wrapper.

Smoking articles according to the invention may comprise a combustible heat source according to the invention and an aerosol-forming substrate located immediately downstream of the combustible heat source. In such embodiments, the aerosol-forming substrate may abut the combustible heat source.

Alternatively, smoking articles according to the invention may comprise a combustible heat source according to the invention and an aerosol-forming substrate located downstream of the combustible heat source, wherein the aerosol-forming substrate is spaced apart from the combustible heat source.

Preferably, smoking articles according to the invention comprise aerosol-forming substrates comprising at least one aerosol-former and a material capable of emitting volatile compounds in response to heating.

The at least one aerosol former may be any suitable known compound or mixture of compounds that, in use, facilitates formation of a dense and stable aerosol. The aerosol former is preferably resistant to thermal degradation at the operating temperature of the smoking article. Suitable aerosol-formers are well known in the art and include, for example, polyhydric alcohols, esters of polyhydric alcohols, such as glycerol mono-, di- or triacetate, and aliphatic esters of mono-, di- or polycarboxylic acids, such as dimethyl dodecanedioate and dimethyl tetradecanedioate. Preferred aerosol formers for use in smoking articles according to the invention are polyhydric alcohols or mixtures thereof, such as triethylene glycol, 1,3-butanediol and, most preferred, glycerine.

Preferably, the material capable of emitting volatile compounds in response to heating is a charge of plant-based material, more preferably a charge of homogenised plant-based material. For example, the aerosol-forming substrate may comprise one or more materials derived from plants including, but not limited to: tobacco; tea, for example green tea; peppermint; laurel; eucalyptus; basil; sage; verbena; and tarragon. The plant based-material may comprise additives including, but not limited to, humectants, flavourants, binders and mixtures thereof. Preferably, the plant-based material consists essentially of tobacco material, most preferably homogenised tobacco material.

Smoking articles according to the invention may comprise an airflow directing element downstream of the aerosol-forming substrate. The airflow directing element defines an airflow pathway through the smoking article. At least one air inlet is preferably provided between a downstream end of the aerosol-forming substrate and a downstream end of the airflow directing element. The airflow directing element directs the air from the at least one inlet to the mouth end of the smoking article.

The airflow directing element may comprise an open-ended, substantially air impermeable hollow body. In such embodiments, the air drawn in through the at least one air inlet is first drawn upstream along the exterior portion of the open-ended, substantially air impermeable hollow body and then downstream through the interior of the open-ended, substantially air impermeable hollow body.

Smoking articles according to the invention preferably further comprise an expansion chamber downstream of the aerosol-forming substrate and, where present, downstream of the airflow directing element. The inclusion of an expansion chamber advantageously allows further cooling of the aerosol generated by heat transfer from the combustible heat source to the aerosol-forming substrate. The expansion chamber also advantageously allows the overall length of smoking articles according to the invention to be adjusted to a desired value, for example to a length similar to that of conventional cigarettes, through an appropriate choice of the length of the expansion chamber. Preferably, the expansion chamber is an elongate hollow tube.

Smoking articles according to the invention may also further comprise a mouthpiece downstream of the aerosol-forming substrate and, where present, downstream of the airflow directing element and expansion chamber. The mouthpiece may, for example, comprise a filter made of cellulose acetate, paper or other suitable known filtration materials. Preferably, the mouthpiece is of low filtration efficiency, more preferably of very low filtration efficiency. Alternatively or in addition, the mouthpiece may comprise one or more segments comprising absorbents, adsorbents, flavourants, and other aerosol modifiers and additives which are used in filters for conventional cigarettes, or combinations thereof.

If desired, ventilation may be provided at a location downstream of the combustible heat source of smoking articles according to the invention. For example, where present, ventilation may be provided at a location along the integral mouthpiece of smoking articles according to the invention.

Smoking articles according to the invention may be assembled using known methods and machinery.

Figure 2:
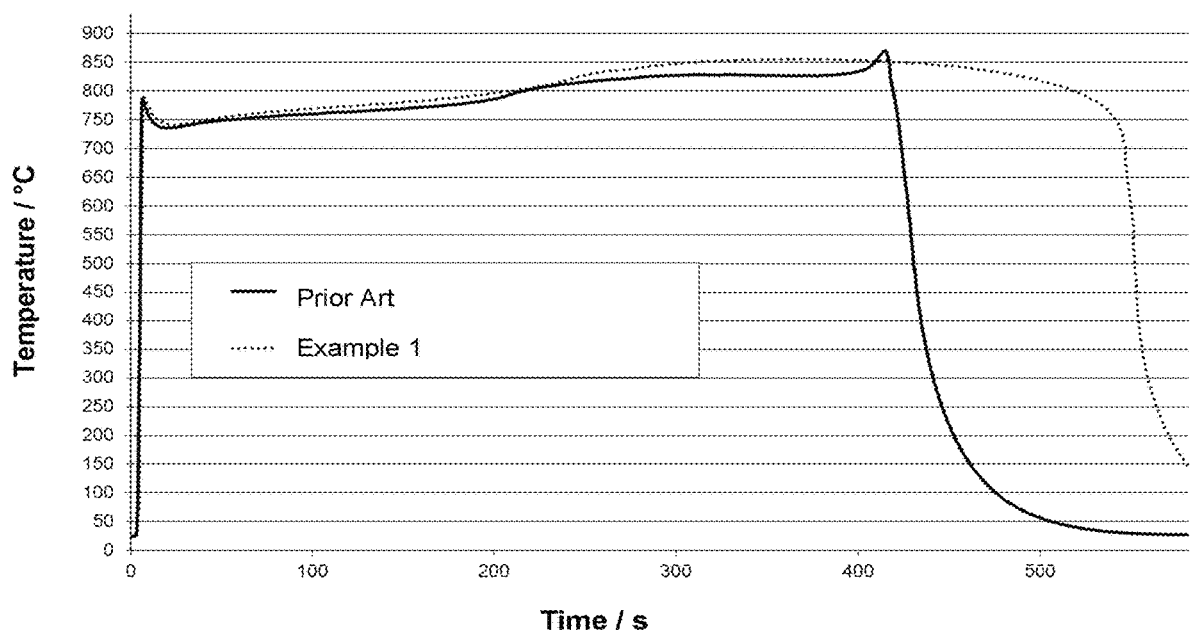

The invention will be further described, by way of example only, with reference to the accompanying drawings in which:

FIG. 1 shows a schematic longitudinal cross-section of a smoking article according to the invention; and FIG. 2 shows a graph of the temperature profile of a combustible heat source according to the invention produced in accordance with Example 1 below and a comparative temperature profile of a prior art heat source.

The smoking article 2 shown in FIG. 1 has an overall length of 70 mm, a diameter of 7.9 mm and comprises a combustible heat source 4 according to the invention, an aerosol-forming substrate 6, an elongate expansion chamber 8 and a mouthpiece 10. As shown in FIG. 1, the combustible heat source 4, aerosol-forming substrate 6, elongate expansion chamber 8 and mouthpiece 10 are in abutting coaxial alignment and are overwrapped in an outer wrapper of cigarette paper 12 of low air permeability.

The combustible heat source 4 is 11 mm in length and 7.8 mm in diameter, and has a density of about 0.84 g/cm$^3$. The combustible heat source 4 comprises a central airflow channel 16 of circular cross-section that extends longitudinally through the combustible heat source 4. A substantially air impermeable, heat resistant coating (not shown) having a thickness of 80 microns is provided on the inner surface of the central airflow channel 16, which is 2 mm in diameter.

The aerosol-forming substrate 6, which is 10 mm in length, 7.8 mm in diameter and has density of about 0.8 g/cm$^3$, is located immediately downstream of the combustible heat source 4. The aerosol-forming substrate 6 comprises a cylindrical plug of homogenised tobacco material 18 comprising glycerine as an aerosol former and circumscribed by filter plug wrap 20. The homogenised tobacco material 18 consists of longitudinally aligned filaments of extruded tobacco material.

A combustion resistant wrapper 22 consisting of a tube of aluminium foil having a thickness of 20 microns, a length of 9 mm and a diameter of 7.8 mm surrounds and is in contact with a rear part 4b of the combustible heat source 4 of 4 mm in length and an abutting front part 6a of the aerosol-forming substrate 6 of 5 mm in length. As shown in FIG. 1, a front part of the combustible heat source 4 of 7 mm in length and a rear part of the aerosol-forming substrate 6 of 5 mm in length are not surrounded by the combustion resistant wrapper 22.

The elongate expansion chamber 8, which is 42 mm in length and 7.8 mm in diameter, is located downstream of the aerosol-forming substrate 6 and comprises a cylindrical open-ended tube of cardboard 24. The mouthpiece 10 of the smoking article 2, which is 7 mm in length and 7.8 mm in diameter, is located downstream of the expansion chamber 8 and comprises a cylindrical plug of cellulose acetate tow 26 of very low filtration efficiency circumscribed by filter plug wrap 28. The mouthpiece 10 may be circumscribed by tipping paper (not shown).

In use, the consumer ignites the combustible heat source 4 and then draws air through the central airflow channel 16 downstream towards the mouthpiece 10. The front part 6a of the aerosol-forming substrate 6 is heated primarily by conduction through the abutting non-combusting rear part 4b of the combustible heat source 4 and the combustion resistant wrapper 22. The drawn air is heated as it passes through the central airflow channel 16 and then heats the aerosol-forming substrate 6 by convection. The heating of the aerosol-forming substrate 6 releases volatile and semi-volatile compounds including the aerosol former from the tobacco material 18, which are entrained in the heated drawn air as it flows through the aerosol-forming substrate. The heated air and entrained compounds pass downstream through the expansion chamber 8, cool and condense to form an aerosol that passes through the mouthpiece into the mouth of the consumer at about ambient temperature.

To make the smoking article 2, a rectangular piece of the combustion resistant wrapper 22 is glued to cigarette paper 12. The combustible heat source 4, the plug of the aerosol-forming substrate 6 and the expansion chamber 8 are suitably aligned and positioned on the cigarette paper 12 with the attached combustion resistant wrapper 22. The cigarette paper 12 with the attached combustion resistant wrapper 22 is wrapped around the rear part 4b of the combustible heat source 4, the aerosol-forming substrate 6 and the expansion chamber 8 and glued. The mouthpiece 10 is attached to the open end of the expansion chamber using known filter combining technology.

Combustible heat sources according to the invention may be produced in accordance with Example 1 or Example 2 below. Example 1 describes a pressing process for producing a combustible heat source and Example 2 describes an extrusion process.

EXAMPLE 1

PRESSING

Combustible heat sources according to the invention were prepared by mixing the components shown in Table 1 below to form a granulate mixture.

TABLE 1

| COMPONENT | FUNCTION | AMOUNT (grams) |
|---|---|---|
| Unpyrolysed carbon powder | Fuel | 135 |
| Calcium peroxide (75% purity) | Ignition aid | 150 |
| Carboxymethyl cellulose | Organic polymeric binder | 5 |
| Mono-potassium citrate | Carboxylate burn salt | 5 |
| Exfoliated montmorillonite clay | Non-combustible inorganic binder | 5 |
| Deionised water | Solvent | 196 |

800 mg of the mixture was introduced into the cylindrical mould cavity of a pressing mould using a funnel and the mixture was pressed within the mould cavity using a manual press to obtain a cylindrical heat source having a length of 13 mm. The pressed heat source was removed from the mould cavity and then dried at about 100° C. for about 1 hour and conditioned at about 22° C., 30 percent relative humidity, for about 12 hours. The density of the heat source was between about 0.80 g/cm$^3$ and about 0.85 g/cm$^3$.

The temperature of a combustible heat source 4 produced according to Example 1 during ignition and combustion of the combustible heat source 4 was measured using a thermocouple inserted into the middle of the combustible heat source. The results are shown in FIG. 2. To generate the profile shown in FIG. 2, the upstream end of the combustible heat source was ignited using a conventional yellow flame lighter.

For the purposes of comparison, the temperature of a prior art heat source including only an organic binder material was measured under similar experimental conditions. The prior art heat source was produced in accordance with Example 1, but with the three binder components replaced with 15 grams of carboxymethyl cellulose. The density of the prior art heat source was about 0.84 g/cm$^3$. The results are also shown in FIG. 2.

As can be seen from FIG. 2, the combustible heat source 4 of the invention including the binding agent comprising a combination of organic and inorganic binder materials achieved a higher burning temperature and a longer burn lifetime than the prior art heat source including only organic binder material. These results demonstrate an improvement in the burning properties provided through the use of the improved binding agent including the specific combination of three binder components, as described above. In particular, these results demonstrate that the use of the improved binding agent including the specific combination of three binder components surprisingly results in the combustible heat source 4 of the invention having a longer burn lifetime than the prior art heat source even though the combustible heat source 4 of the invention comprises less combustible organic material than the prior art heat source.

During ignition of a sample of combustible heat sources 4 produced according to Example 1, no sparks or flames were visible for any heat source. In contrast, during lighting of a corresponding sample of prior art heat sources including only organic binder material, sparks or flames were observed during lighting for at least two thirds of the heat sources in the sample. This provides a qualitative indication of the improved integrity of the combustible heat sources of the invention including the three binder components, compared to the prior art heat sources including only organic binder material.

In order to more quantitatively demonstrate the improved integrity of the combustible heat source produced according to Example 1, a "drop off" test was conducted on a sample of 20 heated smoking articles incorporating one of the combustible heat sources prepared according to Example 1. A corresponding drop off test was conducted on a sample of 20 heated smoking articles of the same construction but including a prior art heat source, comprising only organic binder material.

In each case, the combustible heat sources were first conditioned for 12 hours at 22° C. and 50 percent relative humidity. Each heat source was then inserted into a heated smoking article, wherein the same construction of heated smoking article was used for all samples for the purposes of comparison. For each tested smoking article, the smoking article was mounted on a holding bar on a metal block. The mounted smoking article was connected to a vacuum system for performing puffs by drawing air through the smoking article, wherein the vacuum system includes a vacuum pump capable of producing 177.8 mmHg during a puff, with a flow rate of 2 litres per minute.

The combustible heat source was ignited using a yellow flame lighter. Each lit smoking article was then subjected to four cycles of dropping, each cycle comprising twenty drops wherein the metal block on which the smoking article was mounted was dropped by a height of 3.81 cm. The cycles of dropping were actuated immediately after lighting, 3 minutes after lighting, 6 minutes after lighting and 9 minutes after lighting. After each cycle, a two second puff was taken on the smoking article.

For each dropping cycle, the number of drop offs was observed, wherein a "drop off" is constituted by at least one sixth of the length of the combustible heat source falling away from the smoking article. For the sample of 20 cigarettes, the percentage drop off rate was calculated for each cycle, by dividing the number of drop offs during that cycle by the total number of smoking articles, that is 20, and then multiplying this value by 100.

During the test conducted with the sample of 20 smoking articles incorporating combustible heat sources according to the invention produced according to Example 1, a drop off rate of 0 percent (0%) was observed for all of the dropping cycles. No drop offs were observed during the entire experimental test.

During the comparative tests conducted with the sample of 20 smoking articles incorporating prior art heat sources including only organic binder material, a drop off rate of at least 20 percent was observed after the first dropping cycle conducted immediately after ignition and a drop off percentage of at least 40 percent was observed after the second dropping cycle conducted 3 minutes after ignition. No further drop offs were typically observed during the dropping cycles carried out at 6 and 9 minutes after ignition. These results demonstrate that the integrity of the prior art heat sources during burning is less than the integrity of the combustible heat sources of the invention. The prior art heat sources were observed to become more prone to cracking and breakage during burning than the combustible heat source of the invention, incorporating the improved binding agent.

EXAMPLE 2

EXTRUSION

Combustible heat sources according to the invention having similar properties to those exhibited by the combustible heat sources prepared in accordance with Example 1 were prepared as described below.

The same components shown in Table 1 were first mixed in a high shear kneader mixer to form a granulate mixture. Using a ram extruder, the granulate mixture was then extruded at a speed of 60 cm³/min through a die having a central die orifice of circular cross-section with a diameter of 8.7 mm to form cylindrical rods having a length of about 20 cm to about 22 cm and a diameter of about 9.1 mm to about 9.2 mm.

The cylindrical rods were dried at about 22° C., 45 percent relative humidity, for about 24 hours. After drying, the cylindrical rods were cut to form individual combustible heat sources having a length of about 13 mm and a diameter of about 7.8 mm. The individual combustible heat sources were then dried at about 100° C. for about 1 hour and conditioned at about 22° C., percent relative humidity, for about 12 hours. The dried individual heat sources had a mass of about 800 mg.

The invention claimed is:

1. A combustible heat source for a smoking article, the combustible heat source comprising:
   carbon; and
   a binding agent including at least one organic polymeric binder material, at least one carboxylate burn salt, and at least one non-combustible inorganic binder material,
   wherein the at least one non-combustible inorganic binder material comprises a sheet silicate material, and
   wherein the binding agent comprises between 30 percent by weight and 75 percent by weight of the organic polymeric binder material, between 8 percent by weight and 40 percent by weight of the carboxylate burn salt, and between 15 percent by weight and 35 percent by weight of the non-combustible inorganic binder material.

2. The combustible heat source according to claim 1, wherein the at least one carboxylate burn salt includes at least one alkali metal citrate salt.

3. The combustible heat source according to claim 1, wherein the at least one organic polymeric binder material comprises a cellulosic material.

4. The combustible heat source according to claim 1, wherein the at least one non-combustible inorganic binder material comprises one or more clays.

5. The combustible heat source according to claim 1, comprising between 2 percent and 10 percent by weight of the binding agent.

6. The combustible heat source according to claim 1, further comprising at least one ignition aid.

7. The combustible heat source according to claim 6, wherein the at least one ignition aid comprises at least one peroxide or superoxide.

8. The combustible heat source according to claim 1, wherein the combustible heat source is a pressed heat source, formed by a pressing process.

9. A combustible heat source for a smoking article, the combustible heat source comprising:
   carbon; and
   a binding agent including at least one organic polymeric binder material, at least one carboxylate burn salt, and at least one non-combustible inorganic binder material,
   wherein the at least one non-combustible inorganic binder material comprises a sheet silicate material,
   wherein the at least one carboxylate burn salt includes one or more of: at least one alkali metal citrate salt, at least one alkali metal acetate salt, and at least one alkali metal succinate salt, and
   wherein the binding agent comprises between 30 percent by weight and 75 percent by weight of the organic polymeric binder material, between 8 percent b weight and 40 percent by weight of the carboxylate burn salt, and between 15 percent by weight and 35 percent by weight of the non-combustible inorganic binder material.

10. The combustible heat source according to claim 9, wherein the at least one carboxylate burn salt includes at least one alkali metal citrate salt.

11. The combustible heat source according to claim 9, wherein the at least one organic polymeric binder material comprises a cellulosic material.

12. The combustible heat source according to claim 9, wherein the at least one non-combustible inorganic binder material comprises one or more clays.

13. The combustible heat source according to claim 9, comprising between 2 percent and 10 percent by weight of the binding agent.

14. The combustible heat source according to claim 9, further comprising at least one ignition aid.

15. The combustible heat source according to claim 14, wherein the at least one ignition aid comprises at least one peroxide or superoxide.

16. The combustible heat source according to claim 9, wherein the combustible heat source is a pressed heat source, formed by a pressing process.

17. A smoking article comprising a combustible heat source according to claim 9, and an aerosol-forming substrate downstream of the combustible heat source.

18. The smoking article according to claim 17, wherein at least a rear part of the combustible heat source and at least a front part of the aerosol-forming substrate are wrapped in a combustion resistant wrapper.

19. A smoking article comprising a combustible heat source according to claim 1, and an aerosol-forming substrate downstream of the combustible heat source.

20. The smoking article according to claim 19, wherein at least a rear part of the combustible heat source and at least a front part of the aerosol-forming substrate are wrapped in a combustion resistant wrapper.

21. A binding agent to improve the integrity of a carbon-containing combustible heat source for a smoking article, the binding agent comprising:
   at least one organic polymeric binder material;
   at least one carboxylate burn salt; and
   at least one non-combustible inorganic binder material,
   wherein the at least one non-combustible inorganic binder material comprises a sheet silicate material, and
   wherein the binding agent further comprises between 30 percent by weight and 75 percent by weight of the organic polymeric binder material, between 8 percent by weight and 40 percent by weight of the carboxylate burn salt, and between 15 percent b weight and 35 percent by weight of the non-combustible inorganic binder material.

22. A method of producing a combustible heat source having improved integrity, the method comprising:

combining one or more carbon-containing materials with a binding agent including at least one organic polymeric binder material, at least one carboxylate burn salt, and at least one non-combustible inorganic binder material, wherein the at least one non-combustible inorganic binder material comprises a sheet silicate material, and wherein the binding agent further includes between 30 percent by weight and 75 percent by weight of the organic polymeric binder material, between 8 percent by weight and 40 percent by weight of the carboxylate burn salt, and between 15 percent by weight and 35 percent by weight of the non-combustible inorganic binder material;

pre-forming the mixture of the one or more carbon-containing materials and the binding agent into an elongate rod; and drying the elongate rod.

23. A combustible heat source for a smoking article, the combustible heat source comprising:

carbon; and a binding agent comprising between 30 percent by weight and 75 percent by weight of carboxymethyl cellulose, between 8 percent by weight and 40 percent by weight of potassium citrate, and between 15 percent by weight and 35 percent by weight of clay.

* * * * *